US008849320B2

(12) United States Patent
Park et al.

(10) Patent No.: US 8,849,320 B2
(45) Date of Patent: Sep. 30, 2014

(54) METHOD AND APPARATUS FOR CONSTRUCTING DATABASE IN MOBILE COMMUNICATION TERMINAL

(75) Inventors: Jun Hyo Park, Gumi-si (KR); Jeong-Hoon Kim, Gumi-si (KR); Jong In Kwak, Daegu (KR); Chae Whan Lim, Daegu (KR); Ban Suk Choi, Daegu (KR); Ki Yeung Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1317 days.

(21) Appl. No.: 11/839,170

(22) Filed: Aug. 15, 2007

(65) Prior Publication Data

US 2008/0045205 A1 Feb. 21, 2008

(30) Foreign Application Priority Data

Aug. 18, 2006 (KR) .......................... 10-2006-0078341

(51) Int. Cl.
*H04W 4/00* (2009.01)
*G06F 17/30* (2006.01)

(52) U.S. Cl.
CPC .............................. *G06F 17/30038* (2013.01)
USPC ....... 455/466; 455/66.1; 455/414.1; 455/418; 709/203; 709/204; 709/207; 709/217; 715/810; 715/716

(58) Field of Classification Search
USPC .............. 455/466, 66.1, 414.1, 418; 707/661, 707/650, 620; 709/203, 204, 207, 217; 715/764, 810, 716
See application file for complete search history.

(56) References Cited

U.S. PATENT DOCUMENTS

| 6,356,913 | B1 | 3/2002 | Chu et al. |
| 6,690,659 | B1 | 2/2004 | Ahmed et al. |
| 2001/0027396 | A1* | 10/2001 | Sato .............................. 704/260 |
| 2002/0048224 | A1* | 4/2002 | Dygert et al. ..................... 369/1 |
| 2002/0082837 | A1* | 6/2002 | Pitman et al. ............. 704/270.1 |
| 2002/0099737 | A1* | 7/2002 | Porter et al. .................. 707/513 |
| 2003/0046703 | A1* | 3/2003 | Knowles et al. ................ 725/92 |
| 2003/0182139 | A1* | 9/2003 | Harris et al. ...................... 705/1 |
| 2004/0267715 | A1* | 12/2004 | Polson et al. ..................... 707/3 |
| 2006/0195515 | A1* | 8/2006 | Beaupre et al. ............... 709/203 |
| 2006/0236847 | A1* | 10/2006 | Withop ........................... 84/612 |
| 2007/0055697 | A1* | 3/2007 | Parlin et al. ................ 707/104.1 |

FOREIGN PATENT DOCUMENTS

JP 2005301558 10/2005

OTHER PUBLICATIONS

"Integrated Method for Scrolling Individual or Multiple Items in a Data Field on a Handheld Mobile Device" IP. Comm Journal, IP. Com Inc., West Henrietta, NY, US, Nov. 19, 2004, XP013022238 ISSN: 1533-0001.
"A Means of Capturing Message Data in a Database Table" IP. Comm Journal, IP. Com Inc., West Henrietta, NY, US, Apr. 10, 2006, XP013113535 ISSN: 1533-0001.
European Search Report dated Nov. 8, 2007.
European Office Action issued on Jan. 22, 2013 in European Patent Application No. 07 016 026.2-1527.

* cited by examiner

*Primary Examiner* — Quan M Hua
(74) *Attorney, Agent, or Firm* — H.C. Park & Associates, PLC (57) ABSTRACT

A method of constructing a database in a mobile communication terminal includes analyzing one of a file attribute and a database field type of the received file when the file is received, determining whether the analyzed one of the file attribute and the database field type is identical to a field type of the database in the mobile communication terminal, and updating a database table in the mobile communication terminal according to the determination.

13 Claims, 6 Drawing Sheets

METHOD AND APPARATUS FOR CONSTRUCTING DATABASE IN MOBILE COMMUNICATION TERMINAL

CROSS REFERENCE TO RELATED APPLICATION

This application claims priority from and the benefit of Korean Patent Application No. 10-2006-0078341, filed Aug. 18, 2006, which is hereby incorporated by reference for all purposes as if fully set forth herein.

BACKGROUND OF THE INVENTION

1. Field of the Invention

The present invention relates to a method and apparatus for constructing a database in a mobile communication terminal, and more particularly, to a method and apparatus for constructing a database in a mobile communication terminal that may efficiently search for and execute a multimedia file.

2. Discussion of the Background

Because mobile communication terminals have various functions, they require greater storage capacity for data files. Accordingly, technology for storing and executing a large volume of multimedia files having a file extension (*.wmv, *.asf, etc.) that can be applied to a personal computer (PC) and a mobile communication terminal has been developed.

In general, when a mobile communication terminal receives a multimedia file through a wired and wireless communication network or a wired and wireless Internet network, the mobile communication terminal receives both file attributes and a file database of the multimedia file. The file database can collect and arrange data such as a character, a symbol, a voice, an image, and a moving image in a large quantity according to an established rule.

However, because a conventional mobile communication terminal does not have a database, when the mobile communication terminal receives a multimedia file from a server, the mobile communication terminal may read and store only a few of the file attributes of the multimedia file or some of the field information of a file database of the multimedia file from a file header. Accordingly, it may be difficult to efficiently perform a search for a plurality of multimedia files stored in a mobile communication terminal.

For example, when a mobile communication terminal having no database receives a music video file from a server using a Multicast Transport Protocol (MTP), the mobile communication terminal may be able to execute the music video file without converting the corresponding field information. However, the mobile communication terminal may be able to read and store only some (for example, a file extension, a file size, and a file name) of the field information (e.g. a file extension, a file size, a file name, an artist name, a composition title, an album title, and a genre) of the database of the music video file from a file header. In this case, it may not be possible to search or store a plurality of multimedia files stored in the mobile communication terminal based on the field information that was not read and stored (e.g. artist name, album title, and genre).

SUMMARY OF THE INVENTION

The present invention provides a method and apparatus for constructing a database in a mobile communication terminal that may automatically add a file attribute of a multimedia file or field information of a database of the multimedia file to a database in the mobile communication terminal.

The present invention also provides a method and apparatus for constructing a database in a mobile communication terminal that may efficiently search for and execute a multimedia file stored in the mobile communication terminal.

Additional features of the invention will be set forth in the description which follows, and in part will be apparent from the description, or may be learned by practice of the invention.

The present invention discloses a method of constructing a database in a mobile communication terminal, including analyzing one of a file attribute and a database field type of a received file when the file is received, comparing the analyzed one of the file attribute and the database field type to a field type of the database in the mobile communication terminal, and updating a database table in the mobile communication terminal accordingly.

The present invention also discloses an apparatus for constructing a database in a mobile communication terminal including a controller and a display unit. The controller extracts specific information from a file attribute or a field type identical to a field type of the database in the mobile communication terminal among the file attribute of the received file and the field type of a database when a multimedia file including the database is received. The controller adds the extracted specific information to the corresponding database field in the mobile communication terminal. The display unit outputs a database table in the mobile communication terminal to the specific information is added.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

A mobile communication terminal according to an exemplary embodiment of the present invention may include a photographing function, a mobile communication function, a digital broadcasting reception function, and an information processing function.

Figure 1:
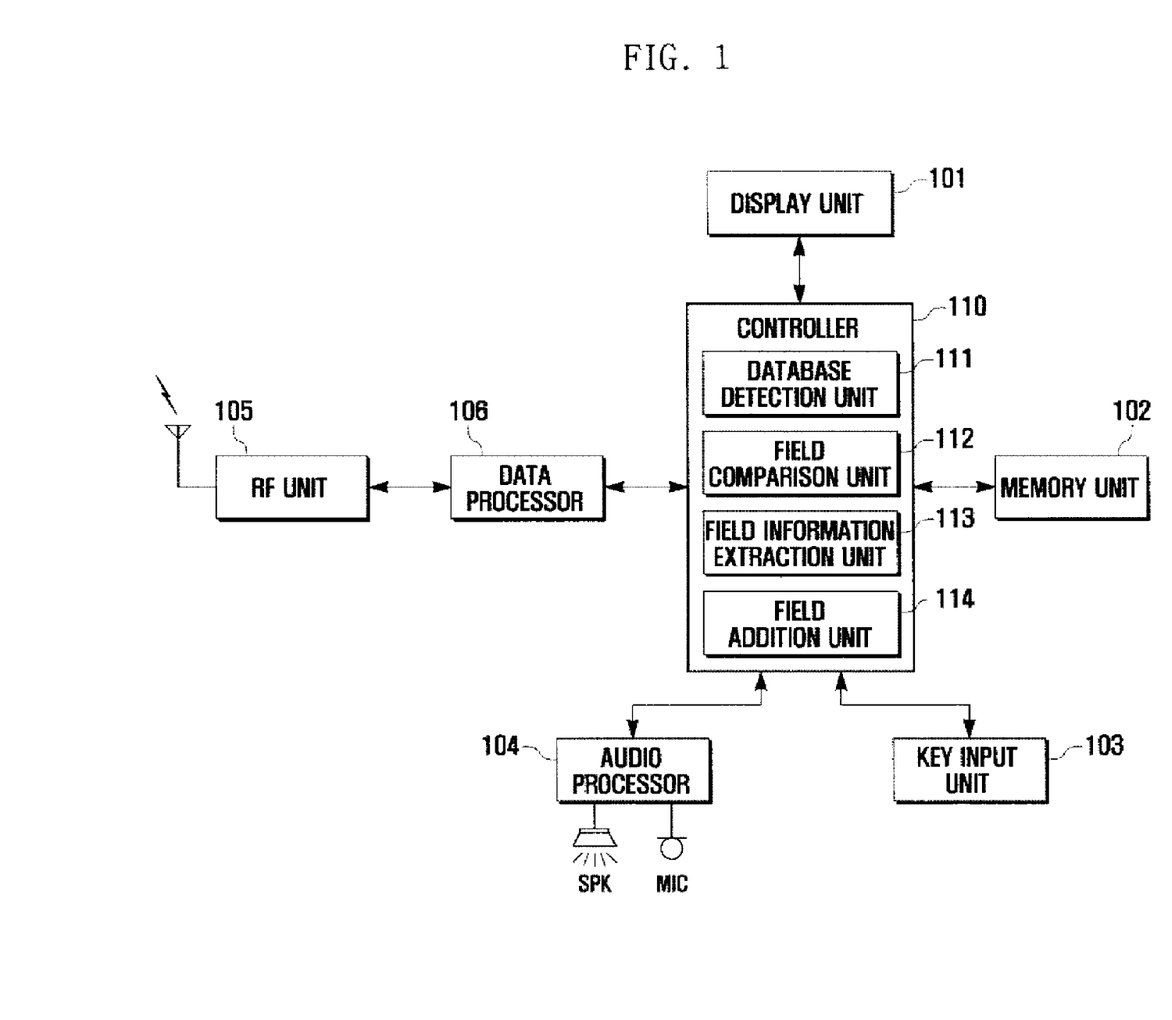
FIG. 1 is a block diagram showing a configuration of a mobile communication terminal according to an exemplary embodiment of the present invention.

FIG. 1 is a block diagram showing a configuration of a mobile communication terminal according to an exemplary embodiment of the present invention.

The mobile communication terminal includes a display unit 101, a memory unit 102, a key input unit 103, an audio processor 104, a radio frequency (RF) unit 105, a data processor 106, and a controller 110. The controller 110 includes a database detection unit 111, a field comparison unit 112, a field information extraction unit 113, and a field addition unit 114.

The display unit 101 displays an image corresponding to a multimedia file on a screen when the multimedia file is executed. The display unit 101 may include a panel including a light emitting element (e.g. a Liquid Crystal Display (LCD) or an Organic Light Emitting Diode (OLED)). The panel may have a touch screen function.

The memory unit 102 may store an operating system file to operate the mobile communication terminal and a large volume of multimedia files. A multimedia file may include a file having a file extension that can be executed in a PC, and the multimedia file may also be executed in the mobile communication terminal. Further, the memory unit 102 may temporarily store data generated during the execution of the file. The memory unit 102 may include at least one of a hard disk drive or a non-volatile memory element. The non-volatile memory element may be, for example, a flash memory element. Particularly, in an exemplary embodiment of the present invention, the memory unit 102 may store a database constructed in a specific field table format.

The key input unit 103 may have keys to input a telephone number. The keys may include numeric and character keys and function keys to set various functions. Further, the key input unit 103 may include hotkeys, such as '#' or '*'.

The audio processor 104 may reproduce an audio signal that is output from an audio codec of the data processor 106 through an output device, such as a speaker SPK, and may transmit an audio signal generated from an input device, such as a microphone MIC, to the audio codec of the data processor 106.

The RF unit 105 may perform a wireless communication function of the mobile communication terminal. For this, the RF unit 105 may include an RF transmitter to up-convert a frequency of a signal to be transmitted and amplify the signal and an RF receiver to low-noise amplify a received signal and down-convert a frequency thereof.

The data processor 106 includes a transmitter to encode and modulate the signal to be transmitted and a receiver to demodulate and decode the received signal. That is, the data processor 106 may include a modem and codec. The codec includes a data codec to process packet data and an audio codec to process an audio signal such as a voice. Further, the data processor 106 may receive and process a multimedia file through the RF unit 105.

The controller 110 may control the general operation of the mobile communication terminal. Further, the controller 110 may include the data processor 106. The controller 110 is connected to the display unit 101, the memory unit 102, the audio processor 104, and the data processor 106 to exchange and process data and controls the setting of a call. In an exemplary embodiment of the present invention, the controller 110 includes a database detection unit 111, a field comparison unit 112, a field information extraction unit 113, and a field addition unit 114.

Particularly, when the mobile communication terminal according to an exemplary embodiment of the present invention receives a multimedia file through a wired and wireless communication network, the database detection unit 111 detects whether the received multimedia file includes a database. The database detection unit 111 includes a table reception unit to receive a database of the multimedia file to store in the mobile communication terminal in a table format.

The field comparison unit 112 determines whether a field type of the database of the received multimedia file is identical to that of a database in the mobile communication terminal. The field comparison unit 112 includes a data type comparison unit to compare a data type of the database of the received multimedia with that of the database in the mobile communication terminal.

The field information extraction unit 113 extracts field information from a field of the database of the received multimedia file that has a field type identical to a field type of the database in the mobile communication terminal.

The field addition unit 114 adds the extracted field information to the field database table in the mobile communication terminal. The field addition unit 114 includes a query builder window generator that can execute a selection query, an insertion query, an update query, or a delete query according to key input of the mobile communication terminal.

At least one of the database detection unit 111, the field comparison unit 112, the field information extraction unit 113, and the field addition unit 114 may be provided in the form of software or middleware in the controller 110. Further, at least one of the database detection unit 111, the field comparison unit 112, the field information extraction unit 113, and the field addition unit 114 may be included in another unit. For example, all of the database detection unit 111, the field comparison unit 112, the field information extraction unit 113, and the field addition unit 114 may be provided in and operated with one control program.

Figure 2:
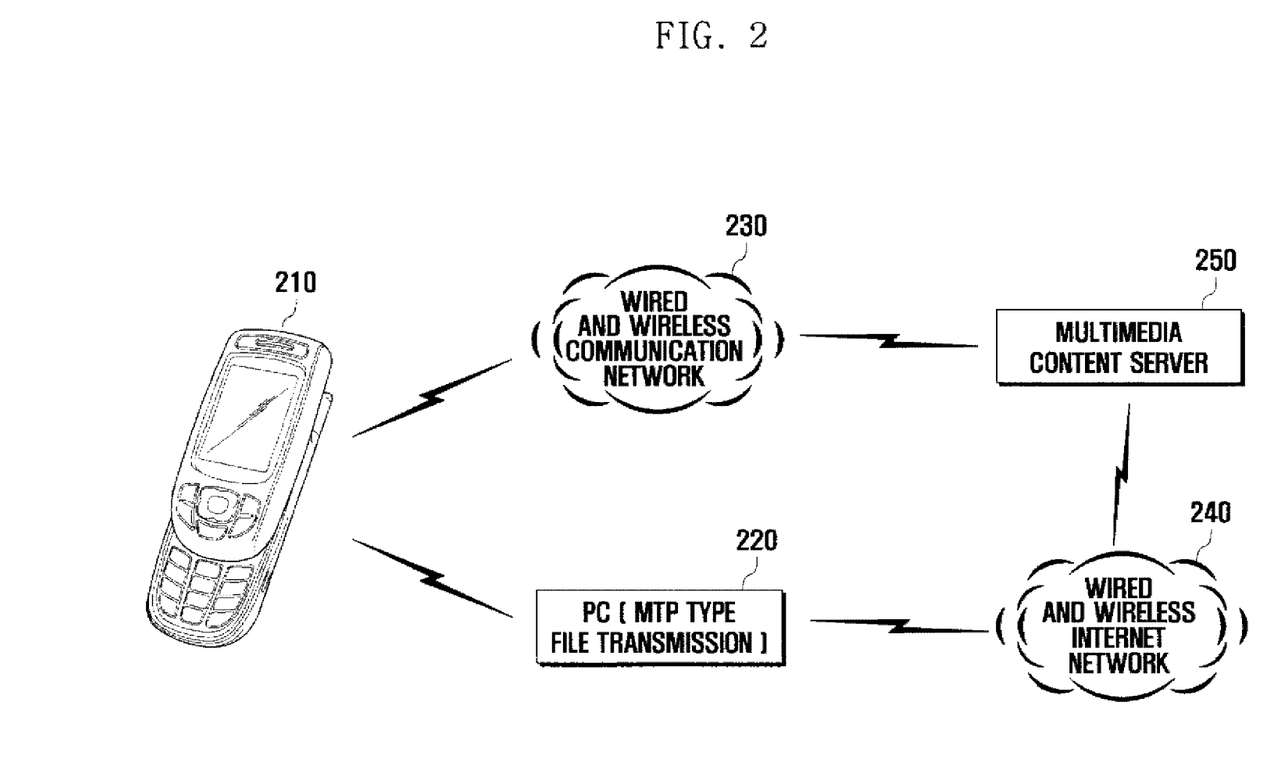
FIG. 2 is diagram showing a configuration of a file reception system of a mobile communication terminal according to an exemplary embodiment of the present invention.

FIG. 2 is a diagram showing a configuration of a file reception system of a mobile communication terminal according to an exemplary embodiment of the present invention.

Referring to FIG. 2, a mobile communication terminal 210 may receive a multimedia file by connecting to a multimedia content server 250 through a wired and wireless communication network 230 or through a wired and wireless Internet network 240, and particularly, may receive and store a large volume of moving files by connecting to a PC 220 through local area wireless communication or a Universal Serial Bus (USB) port.

Figure 3A:
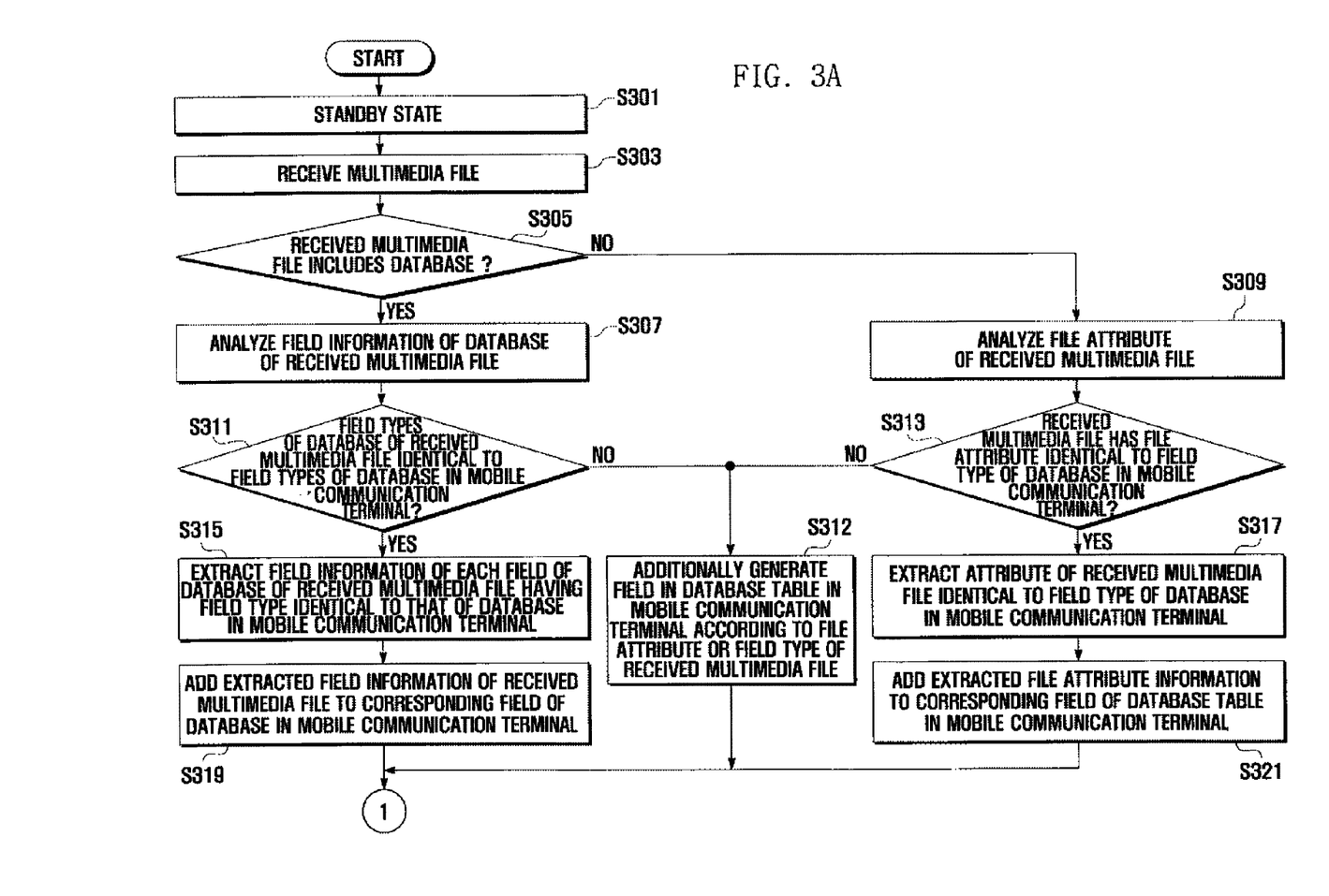
FIG. 3A and FIG. 3B are flowcharts showing a method of constructing a database in a mobile communication terminal according to an exemplary embodiment of the present invention.
Figure 3B:
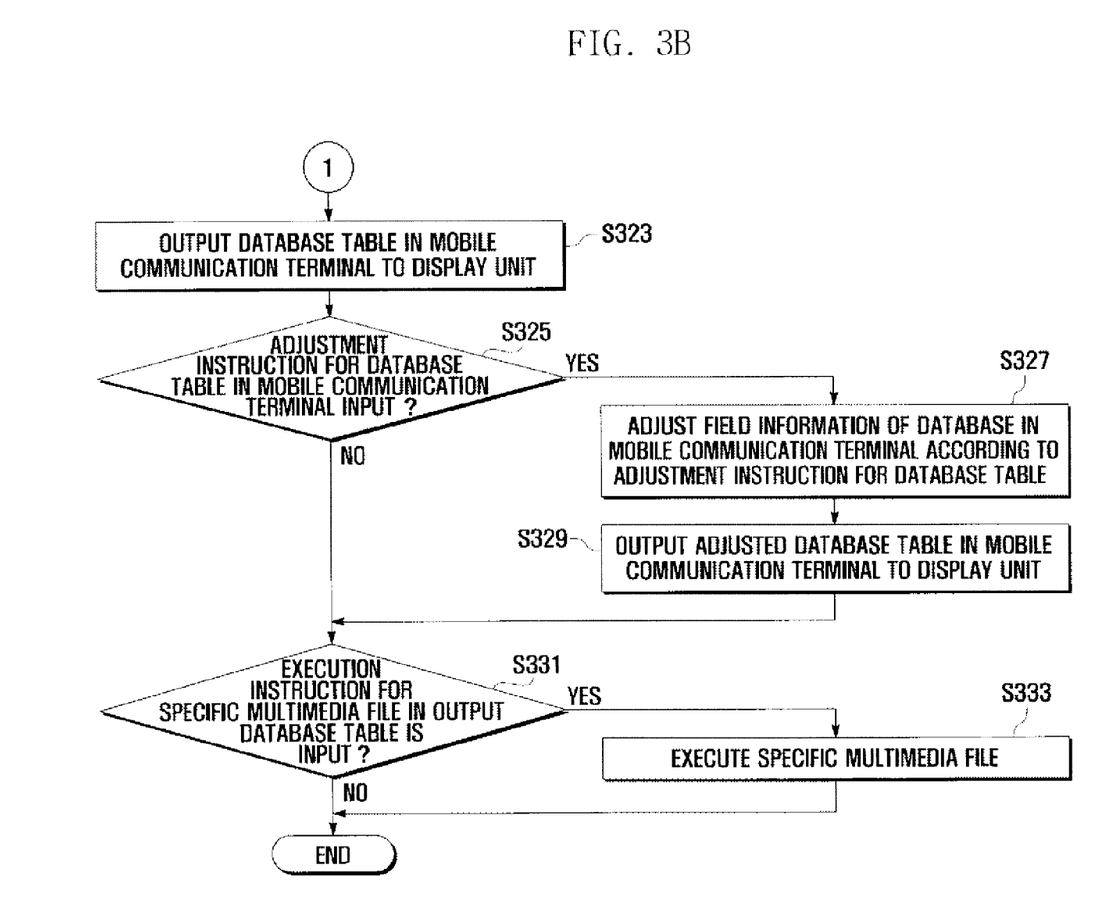

FIG. 3A and FIG. 3B are flowcharts showing a method of constructing a database in the mobile communication terminal 210 according to an exemplary embodiment of the present invention.

The mobile communication terminal 210 is initially in a standby state (S301). The mobile communication terminal 210 has a database constructed with a specific field table format. Table 1 shows an example of a database table of a multimedia file constructed with the specific field table format.

TABLE 1

| | | | Field type | | | | | | |
|---|---|---|---|---|---|---|---|---|---|
| Row | File name | File extension | File size | Genre | Title | Director name | Artist name | Composer | Etc. |
| 1 | Movie 1 | *.wma | 700 M byte | Action | A | F | | | |
| 2 | Music video 1 | *.asf | 30 M byte | Ballade | B | G | H | I | |
| 3 | Game 1 | *.3gp | 50 M byte | Online game | C | | | | |

As shown in Table 1, the mobile communication terminal 210 has a database constructed with a specific field table format, and the database may be generated with, for example, a table format having 50 field types and 1,000 field columns.

The controller 110 of the mobile communication terminal 210 determines whether a file received by the data processor 106 is a multimedia file (S303). The mobile communication terminal 210 displays an execution image in the display unit 101 by executing a multimedia content file having a specific file extension that can be executed in a computer.

The database detection unit 111 detects whether the received multimedia file includes a database (S305). This includes detecting whether the database of the multimedia file has a table format formed using a computer operation program, for example, a spreadsheet program.

If the received multimedia file includes a database, the database detection unit 111 analyzes field information of the database of the received multimedia file (S307).

Table 2 shows an example of a database of the received multimedia file.

TABLE 2

| | | | | Field type | | | |
|---|---|---|---|---|---|---|---|
| Row | File name | File extension | File size | Genre | Composition title | Artist name | Album title |
| 1 | Music video 3 | *.asf | 31 M byte | Hip-Hop | D | J | ABB |
| 2 | Music video 4 | *.asf | 26 M byte | Popular song | E | K | ACC |

The field comparison unit 112 determines whether the field types of the database of the received multimedia file are identical to the field types of the database in the mobile communication terminal 210 (S311). This includes extracting field types from the database of the received multimedia file and comparing the extracted field types with the field types of the database set in the mobile communication terminal 210 and comparing data types of both field types.

The field types may be regarded as "identical" when the field types are actually identical, as well as when the field types are very similar to each other. For example, a field type of 'file format' may be regarded as the same field type as 'file extension'. This is because a field type of 'file format' and that of 'file extension' are identical to each other when each piece of field information of a database table in which a file extension (*.wma, *.asf, etc.) is written is analyzed. Similarly, when a field type of 'title' in Table 1 and that of 'Composition title' in Table 2 can be displayed as a 'Title' in a database, they can be regarded as the same field type.

When Tables 1 and 2 are compared, it can be seen that the database in the mobile communication terminal 210 and that of the received multimedia file have the same field types, i.e., file name, file extension, file size, and artist name.

The field information extraction unit 113 extracts field information from each field of the database of the received multimedia file that has a field type identical to a field type of the database in the mobile communication terminal 210 (S315). For example, when the mobile communication terminal 210 receives music video files 3 and 4, the mobile communication terminal 210 extracts 'Music video 3' and 'Music video 4' as file name information from a database table of the received multimedia file, '*.asf' as file extension information, 31 Mbyte and 26 Mbyte as file size information, and 'F' and 'G' as artist name information. However, album name information (ABB and ACC) is not extracted because the same field type does not exist in the database constructed in the mobile communication terminal 210.

The field addition unit 114 adds the field information of the received multimedia file extracted at step S315 to the corresponding fields of the database in the mobile communication terminal 210 (S319). Accordingly, an adjusted database table in the mobile communication terminal 210 is shown in Table 3.

TABLE 3

| | | | | Field type | | | | | |
|---|---|---|---|---|---|---|---|---|---|
| Row | File name | File extension | File size | Genre | Title | Director name | Artist name | Composer | Etc. |
| 1 | Movie 1 | *.wma | 700 M byte | Action | A | F | | | |
| 2 | Music video 1 | *.asf | 30 M byte | Ballade | B | G | H | I | |
| 3 | Game 1 | *.3gp | 50 M byte | Online game | C | | | | |
| 4 | Music video 3 | *.asf | 31 M byte | Hip-hop | D | | J | | |
| 5 | Music video 4 | *.asf | 26 M byte | Popular song | E | | K | | |

If a field type of the database of the received multimedia file does not correspond to a field type of the database in the mobile communication terminal 210, the field addition unit 114 may generate an additional field in the database of the mobile communication terminal 210 to house the field information of the field type existing only in the database of the received multimedia file (S312). In this case, the field information may be added to the additionally generated field. Accordingly, an updated database table in the mobile communication terminal 210 is shown in Table 4.

TABLE 4

| | | | | | | | | | | |
|---|---|---|---|---|---|---|---|---|---|---|
| | | | | Field Type | | | | | | |
| Row | File name | File extension | File size | Genre | Title | Director Name | Artist name | Composer | Album Title | Etc. |
| 1 | Movie 1 | *.wma | 700 M byte | Action | A | F | | | | |
| 2 | Music video 1 | *.asf | 30 M byte | Ballade | B | G | H | I | | |
| 3 | Game 1 | *.3gp | 50 M byte | Online game | C | | | | | |
| 4 | Music video 3 | *.asf | 31 M byte | Hip-hop | D | | J | | ABB | |
| 5 | Music video 4 | *.asf | 26 M byte | Popular song | E | | K | | ACC | |

If the received multimedia file does not include a database at step S305, the database detection unit 111 analyzes an attribute(s) of the received multimedia file by analyzing a header of the received multimedia file (S309). The file attribute may include, for example, a file name, a file extension name, or a file size, however file attribute information stored in the file header generally includes only very limited file information.

The field comparison unit 112 then determines whether the received multimedia file has a file attribute identical to a field type of the database in the mobile communication terminal 210 (S313). For example, as in Table 5, when the name, the format, and the size exist as file attributes, it can be determined that 3 file attributes, i.e. file name, file extension name, and file size exist that are identical to field types of the database table of Table 1. That is, a file attribute displayed with 'name' is regarded as a file name, a file attribute displayed with 'format' is regarded as a file extension name, and a file attribute displayed with 'size' is regarded as a file size.

TABLE 5

| Name | Format | Size |
|---|---|---|
| Movie 2 | *.wma | 500 Mbyte |
| Music video 5 | *.asf | 13 Mbyte |

If the received multimedia file has a file attribute identical to a file type of the database in the mobile communication 210, the field information extraction unit 113 may extract file attribute information from an attribute of the received multimedia file that is regarded as being identical to a field type of the database in the mobile communication terminal 210 (S317). That is, a file attribute displayed as 'name' is regarded as a file name and file attribute information of 'Movie 2' and 'Music video 5' is extracted, a file attribute displayed as 'format' is regarded as a file extension name and file attribute information of '*.wma' and '*.asf' is extracted, and a file attribute displayed as 'size' is regarded as a file size and file attribute information of '500 MByte' and '13 MByte' is extracted.

The field addition unit 114 adds the extracted file attribute information to the corresponding field of the database table in the mobile communication terminal 210 (S321). Accordingly, the mobile communication terminal 210 may receive a multimedia file that does not include a database, extract file attribute information as in Table 5 from the file header, and add the file attribute information to the database in the mobile communication terminal 210, whereby a database table shown in Table 6 is generated.

TABLE 6

| | | | | | | | | | |
|---|---|---|---|---|---|---|---|---|---|
| | | | | Field type | | | | | |
| Row | File name | File extension | File size | Genre | Title | Director name | Artist name | Composer | Etc. |
| 1 | Movie 1 | *.wma | 700 M byte | Action | A | F | | | |
| 2 | Music video 1 | *.asf | 30 M byte | Ballade | B | G | H | I | |
| 3 | Game 1 | *.3gp | 50 M byte | Online game | C | | | | |
| 4 | Music video 3 | *.asf | 31 M byte | Hip-hop | D | | J | | |

TABLE 6-continued

| | | | Field type | | | | | | |
|---|---|---|---|---|---|---|---|---|---|
| Row | File name | File extension | File size | Genre | Title | Director name | Artist name | Composer | Etc. |
| 5 | Music video 4 | *.asf | 26 M byte | Popular song | E | | K | | |
| 6 | Movie 2 | *.wma | 500 M byte | | | | | | |
| 7 | Music video 5 | *.asf | 13 M byte | | | | | | |

If the received multimedia file has a file attribute (e.g. system file or hidden file) that does not correspond to a field type of the database in the mobile communication terminal 210 at step S313, the field addition unit 114 may generate an additional field in the database of the mobile communication terminal 210 to house the file attribute information existing only in the database of the received multimedia file (S312). In this case, the non-identical file attribute information is added as field information to the additionally generated field. Accordingly, the updated database table in the mobile communication terminal 210 is shown in Table 7.

TABLE 7

| | | | Field type | | | | | | | |
|---|---|---|---|---|---|---|---|---|---|---|
| Row | File name | File extension | File size | Genre | Title | Director name | Artist name | Composer | Etc. | File attribute |
| 1 | Movie 1 | *.wma | 700 M byte | Action | A | F | | | | |
| 2 | Music video 1 | *.asf | 30 M byte | Ballade | B | G | H | I | | |
| 3 | Game 1 | *.3gp | 50 M byte | Online game | C | | | | | |
| 4 | Movie 2 | *.wma | 500 M byte | | | | | | | Hidden |
| 5 | Music video 5 | *.asf | 13 M byte | | | | | | | Hidden |

The controller 110 outputs a database table in the mobile communication terminal 210 to the display unit 101 (S323). The quantity of rows and field types of the database table may be adjusted according to the setting of the user of the mobile communication terminal 210.

The controller 110 determines whether an instruction to adjust the database table in the mobile communication terminal 210 output to the display unit 101 has been input (S325). For example, the controller 110 may determine that a deletion instruction for a 'Movie 2' file or an adjustment instruction to change the genre of music video 4 to "Korean song", instead of "popular song," has been input.

The controller 110 adjusts field information of the database in the mobile communication terminal 210 according to the adjustment instruction (S327).

Outputting a database table with added field information to the display unit 101 includes providing a query build window to execute a select query, an insert query, an update query, and a delete query according to key input of the mobile communication terminal 210 in the display unit 101 of the mobile communication terminal 210. Outputting the database table further includes executing a select query by outputting data of a field to the display unit 101 by selecting a specific field in the database table of a multimedia file output to the display unit 101 of the mobile communication terminal 210 or by outputting data corresponding to a condition by inputting the condition to the field, executing an insert query by inserting file related data into the database table, executing an update query by inputting an update command to the query build window, and executing a delete query by deleting data of the database table.

The controller 110 outputs the adjusted database table in the mobile communication terminal 210 to the display unit 101 (S329). Table 8 shows a database table adjusted from the database table 6 according to a deletion instruction for the 'Movie 2' file and an instruction to adjust a genre of the music video 4 to a Korean song, instead of a popular song.

TABLE 8

| | | | Field type | | | | | | |
|---|---|---|---|---|---|---|---|---|---|
| Row | File name | File extension | File size | Genre | Title | Director name | Artist name | Composer | Etc. |
| 1 | Movie 1 | *.wma | 700 M byte | Action | A | F | | | |
| 2 | Music video 1 | *.asf | 30 M byte | Ballade | B | G | H | I | |
| 3 | Game 1 | *.3gp | 50 M byte | Online game | C | | | | |
| 4 | Music video 3 | *.asf | 31 M byte | Hip-hop | D | | J | | |
| 5 | Music video 4 | *.asf | 26 M byte | Korean song | E | | K | | |

TABLE 8-continued

| | | | Field type | | | | | | |
|---|---|---|---|---|---|---|---|---|---|
| Row | File name | File extension | File size | Genre | Title | Director name | Artist name | Composer | Etc. |
| 6 | Music video 5 | *.asf | 13 M byte | | | | | | |

The controller 110 determines whether an execution instruction for a specific multimedia file has been input to the output database table (S331). The user of the mobile communication terminal 210 may input a file execution instruction by selecting a specific file in the output database table using a method of adjusting the database table at step S325.

If a file execution instruction is input, the controller 110 executes a specific multimedia file in which execution is requested according to the file execution instruction (S333).

Figure 4A:
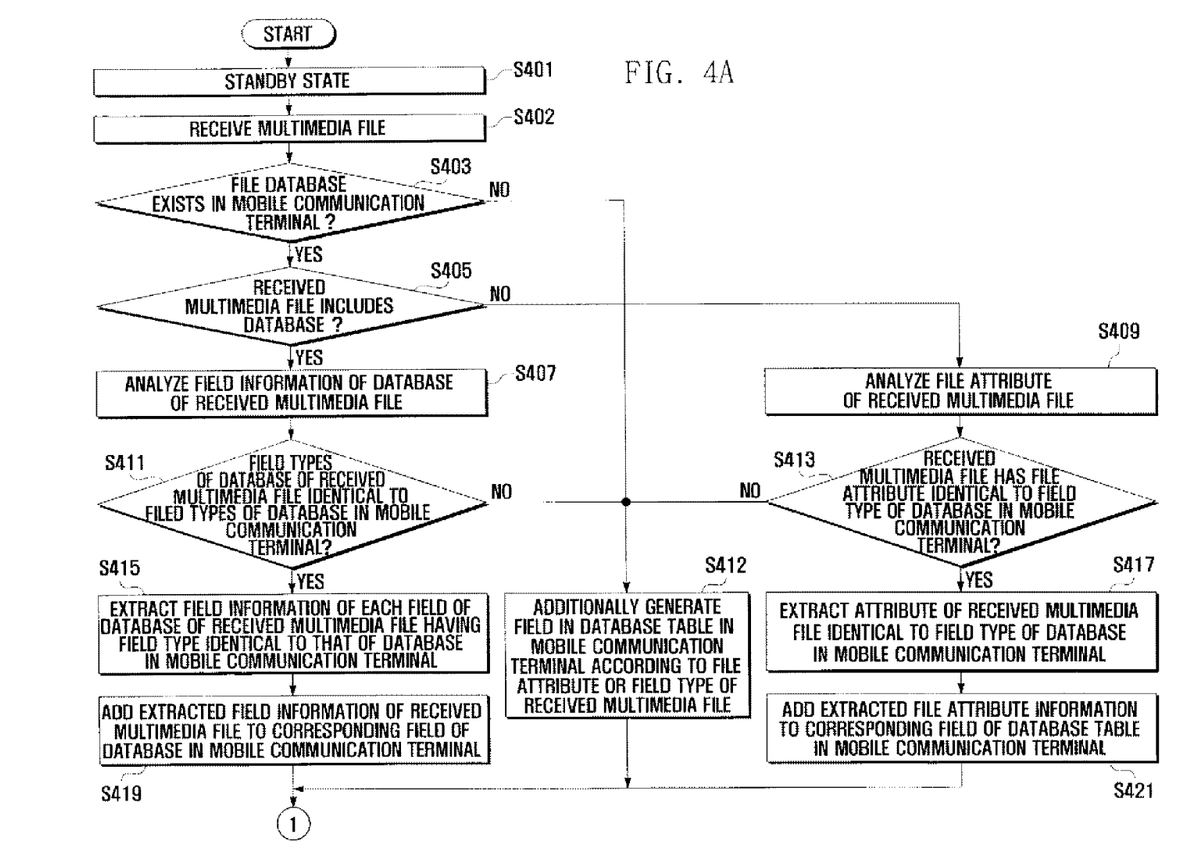
FIG. 4A and FIG. 4B are flowcharts showing a method of constructing a database in a mobile communication terminal according to another exemplary embodiment of the present invention.
Figure 4B:
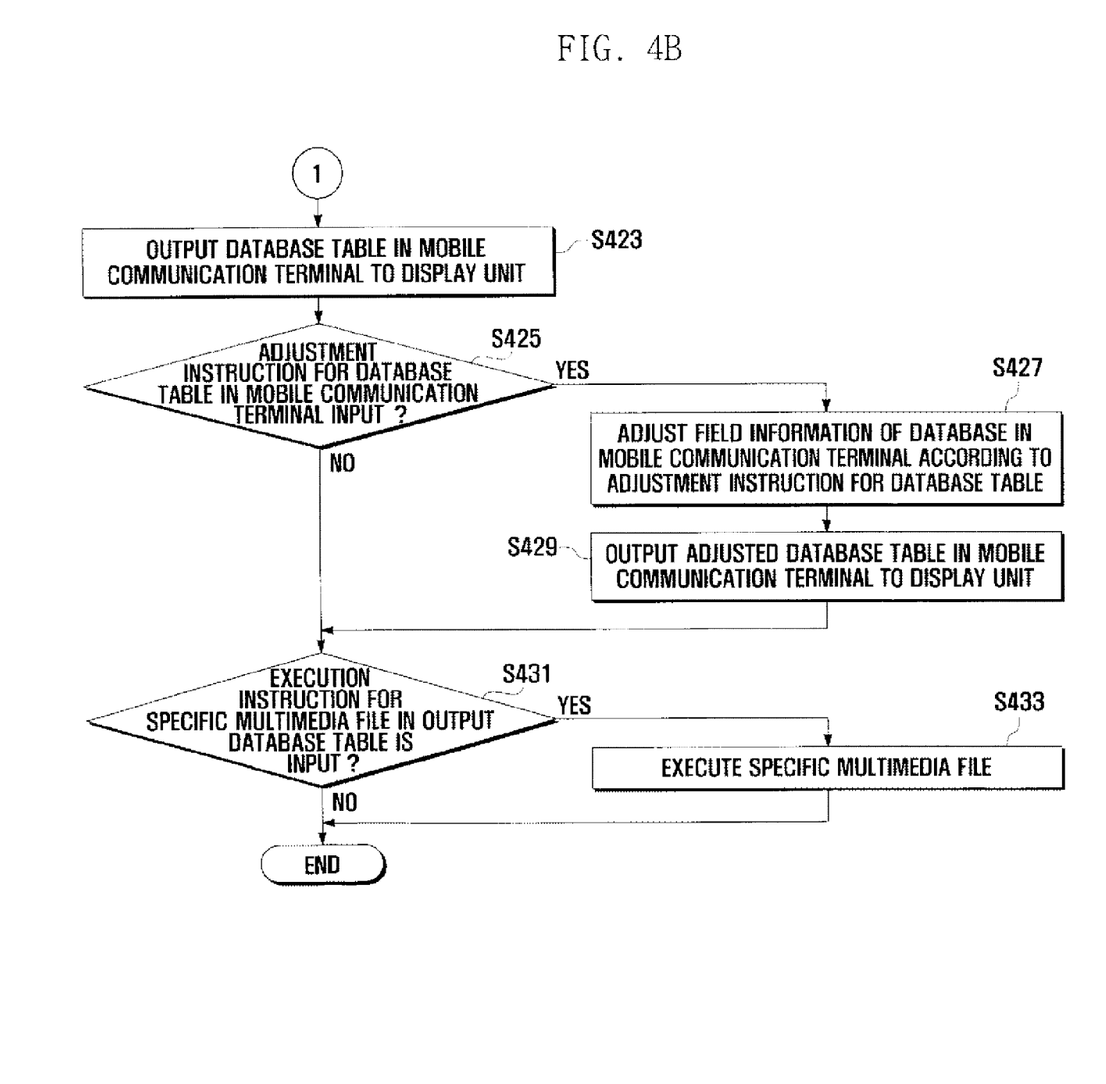

FIG. 4A and FIG. 4B are flowcharts showing a method of constructing a database in the mobile communication terminal 210 according to another exemplary embodiment of the present invention.

Steps S401 and S402 of FIG. 4A and FIG. 4B correspond to steps S301 and S303, respectively, and steps S405 to S433 correspond to steps S305 to S333, respectively.

However, after step S402, when a multimedia file is received, the controller 110 then determines whether a file database exists in the mobile communication terminal 210 (S403), and if a file database does not exist in the mobile communication terminal 210, a file database is newly generated in the memory unit 102 according to a file attribute or field type of a file that the mobile communication terminal 210 (S412).

As described above, according to exemplary embodiments of the present invention, a file attribute of a multimedia file or field information of a database of the multimedia file may be automatically added to a database in the mobile communication terminal and thus the search for and execution of the multimedia file stored in the mobile communication terminal may be efficiently performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for constructing a database in a mobile terminal, comprising:
    determining whether a database exists in a file after receiving the file;
    determining whether a database field type of the received file is identical to a field type of the database in the mobile terminal;
    updating a database table in the mobile terminal according to an identity of the field type of the received file; and
    generating a field configured to house field information existing in the database,
    wherein updating the database table in the mobile terminal comprises:
        extracting field information from a field of the database of the received file comprising the database field type identical to the field type of the database table in the mobile terminal; and
        adding the extracted field information to the corresponding field of the database table in the mobile terminal, and
    wherein the field is generated based on a determination of whether the database field type is not identical to the field type of the database in the mobile terminal.

2. The method of claim 1, further comprising:
    determining whether a file attribute of the received file is identical to the field type of the database in the mobile terminal if the database does not exist in the received file,
    wherein the generated field comprises at least one of the database field type and the file attribute of the received file in the database table.

3. The method of claim 1, further comprising adding the corresponding field information of the database of the received file to the generated field.

4. The method of claim 1, wherein updating the database table in the mobile terminal comprises:
    extracting file attribute information of a file attribute identical to the field type of the database table in the mobile terminal if the file attribute identical to the field type of the database table in the mobile terminal exists among file attributes of the received file; and
    adding the extracted file attribute information to the corresponding field attribute of the database table in the mobile terminal.

5. The method of claim 4, further comprising generating a field configured to house file attribute information existing in the corresponding file attribute in the database table in the mobile terminal.

6. The method of claim 5, further comprising adding the corresponding file attribute information to the generated field.

7. The method of claim 1, further comprising correcting field information of the updated database table.

8. The method of claim 7, wherein correcting field information of the updated database table comprises:
    providing a query builder window in a display unit of the mobile terminal, the query builder window to execute at least one of a selection query, an insertion query, an update query, and a delete query by key input of the mobile terminal;
    selecting a specific field among fields of the database table and outputting data of the specific field to the display unit or inputting a condition to a field and outputting data corresponding to the condition;
    inputting an update instruction to the query builder window and executing the update instruction;
    inserting file related data into the database table; and
    deleting data of the database table.

9. An apparatus configured to construct a database in a mobile terminal, comprising:
    a controller to determine whether a database exists in a multimedia file after receiving the multimedia file, to extract specific information from a field type of the database of the received multimedia file, to determine whether the extracted specific information is identical to a field type of a database in the mobile terminal, to add the extracted specific information to the corresponding database field in the mobile terminal, and to generate a field configured to house field information existing in the database; and a display unit to output the database table in the mobile terminal, the database table comprising the added specific information, wherein the controller is configured to generate the field based on a determination of whether the field type of the database of the received multimedia file is not identical to the field type of the database in the mobile terminal.

10. The apparatus of claim 9, wherein the controller comprises a table reception unit to receive the database of the multimedia file to store in the mobile terminal in a table format.

11. The apparatus of claim 9, wherein the controller comprises a data type comparison unit to compare a data type of the database of the received multimedia file with data types of the database table in the mobile terminal.

12. The apparatus of claim 9, wherein the controller comprises a query builder window generator to execute at least one of a selection query, an insertion query, an update query, and a delete query by key input of the mobile terminal.

13. The apparatus of claim 9, wherein the specific information comprises at least one of file attribute information extracted from a file attribute of the multimedia file and field information extracted from each field of the database of the multimedia file, and wherein the generated field comprises at least one of the field type of the database and the file attribute of the multimedia file in a database table in the mobile terminal.

* * * * *